UNITED STATES PATENT OFFICE.

CHARLES F. MABERY, OF CLEVELAND, OHIO, ASSIGNOR TO THE COWLES ELECTRIC SMELTING AND ALUMINUM COMPANY, OF SAME PLACE.

PRODUCING ANHYDROUS ALUMINIUM CHLORIDE.

SPECIFICATION forming part of Letters Patent No. 351,184, dated October 19, 1886.

Application filed March 10, 1886. Serial No. 194,739. (No specimens.)

*To all whom it may concern:*

Be it known that I, CHARLES F. MABERY, of Cleveland, in the county of Cuyahoga and State of Ohio, have invented certain new and useful Improvements in Processes or Methods of Producing Anhydrous Aluminium Chloride; and I do hereby declare the following to be a full, clear, and exact description of the invention, such as will enable others skilled in the art to which it pertains to make and use the same.

My invention relates to an improved process or method of producing anhydrous aluminium chloride; and it consists, essentially, in the steps hereinafter described and claimed.

Heretofore the production of aluminium chloride has been confined to a process in which anhydrous aluminium chloride has been manufactured by passing chlorine gas over a mixture of purified oxide of aluminium with carbon, the anhydrous chloride of aluminium being volatilized out of the retort and condensed in a suitable receiver. Another process is as follows: The alumina is placed in a porcelain or earthen tube and heated to redness. As soon as all the water is expelled from the alumina, the tube is connected at one end with a receiver and at the other end with a tube, bringing in a mixture of hydrochloric gas and sulphide of carbon. A double reaction takes place simultaneously, and chloride of aluminium impregnated with hydrogen sulphur distills at once. The aluminium chloride is afterward redistilled with iron filings, so as to free it from the sulphur and other impurities. Such process is slow and expensive, both on account of purifying the ore and on account of the cost of the chlorine necessarily employed. At the present time aluminium, either free or alloyed with other metals—such, for instance, as tin, copper, manganese, &c.—is being very cheaply produced by means of electricity, and I have discovered that the aluminium thus produced, either pure or alloyed, can be directly converted into anhydrous aluminium chloride at a greatly-reduced initial cost.

The process is as follows: Aluminium alloy is placed in a glass or porcelain tube, retort, or furnace of fire-clay, whichever may be preferred, and is heated to from 200° to 300° centigrade. Meanwhile hydrochloric-acid gas manufactured in the usual manner is passed over the heated aluminium alloy. The chlorine of the hydrochloric-acid gas combines with the aluminium, forming chloride of aluminium, which latter is volatilized, while the other metals remain in the tube or retort. The chloride thus formed passes forward through a suitable discharging-tube in the form of vapor, and is condensed in a suitable receiver. This process may be carried out by passing the hydrochloric-acid gas directly through the electric furnace where and during the time the aluminium is being reduced from clay or other ore.

What I claim is—

1. The process or method herein described of producing anhydrous aluminium chloride, and consisting, essentially, first, in heating in a retort or suitable container aluminium alloy to about from 200° to 300° centigrade; second, passing hydrochloric-acid gas over the heated aluminium alloy, and condensing the vaporized aluminium chloride thus formed, substantially as set forth.

2. The process or method herein described of producing anhydrous aluminium chloride, and consisting, essentially, of passing hydrochloric-acid gas through an electric furnace where and during the time the metallic aluminium is being reduced from clay or other ores, substantially as set forth.

In testimony whereof I sign this specification, in the presence of two witnesses, this 13th day of February, 1886.

CHARLES F. MABERY.

Witnesses:
CHAS. H. DORER,
ALBERT E. LYNCH.